(12) United States Patent
Visser

(10) Patent No.: US 9,674,072 B1
(45) Date of Patent: *Jun. 6, 2017

(54) ROUTE TOPOLOGY DISCOVERY IN DATA NETWORKS

(71) Applicant: NECTAR SERVICES CORP., Farmingdale, NY (US)

(72) Inventor: Lance Arnold Visser, Dallas, TX (US)

(73) Assignee: Nectar Services Corp., Jericho, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,083

(22) Filed: Jul. 11, 2016

Related U.S. Application Data

(63) Continuation of application No. 14/285,326, filed on May 22, 2014, now Pat. No. 9,391,872, which is a continuation of application No. 13/242,985, filed on Sep. 23, 2011, now Pat. No. 8,750,166.

(51) Int. Cl.
*H04L 12/28* (2006.01)
*H04L 12/751* (2013.01)
*H04L 12/721* (2013.01)
*H04L 12/24* (2006.01)

(52) U.S. Cl.
CPC .............. *H04L 45/02* (2013.01); *H04L 41/12* (2013.01); *H04L 45/123* (2013.01)

(58) Field of Classification Search
CPC ..... H04L 12/56; H04L 2012/56; H04L 45/02; H04L 45/04; H04L 45/10; H04L 49/255; H04L 12/5601; H04L 2012/5609; H04L 49/256; H04L 49/1553; H04L 45/54; H04L 49/3009
USPC .......... 370/389, 400, 367, 386, 396, 395.31, 370/395.32, 395.41
See application file for complete search history.

(56) References Cited

U.S. PATENT DOCUMENTS

| | | | |
|---|---|---|---|
| 8,750,166 B2 * | 6/2014 | Visser | H04L 41/12 370/255 |
| 9,391,872 B2 * | 7/2016 | Visser | H04L 45/123 |
| 2012/0144066 A1 * | 6/2012 | Medved | H04L 45/02 709/242 |

* cited by examiner

*Primary Examiner* — Brenda H Pham

(57) ABSTRACT

A system and method for performing topology discovery in a data network is provided. Network elements utilizing a distance-vector protocol, such as EIGRP, advertises routes and metric information. A resource control point or other element analyzes the advertised routes and metrics and determines the nexthop, thereby providing a topology map of the network.

3 Claims, 10 Drawing Sheets

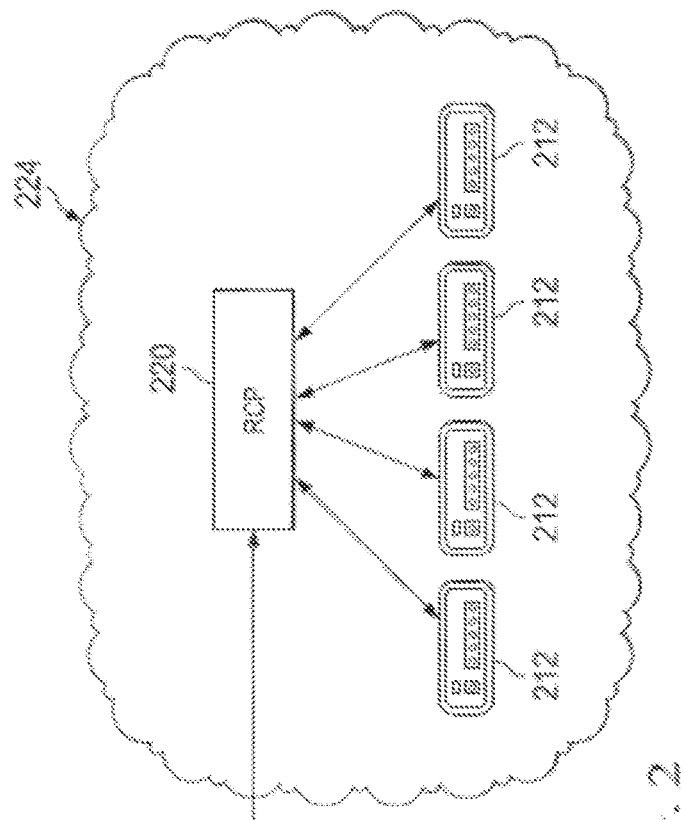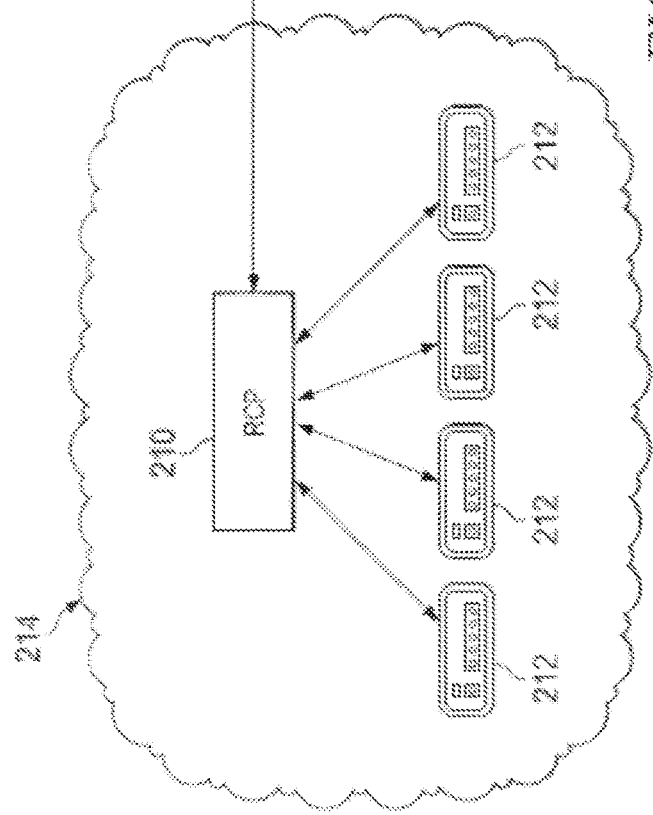
FIG. 2

ROUTE TOPOLOGY DISCOVERY IN DATA NETWORKS

CROSS-REFERENCE TO RELATED APPLICATIONS

This application is a continuation of co-pending U.S. patent application Ser. No. 14/285,326 filed May 22, 2015, which is in turn a continuation of U.S. patent application Ser. No. 13/242,985 filed on Sep. 23, 2011, now U.S. Pat. No. 8,750,166. The entire disclosures of each of said applications are hereby incorporated by reference.

TECHNICAL FIELD

Background

The present invention relates generally to telecommunications and, more particularly, to a system and method for providing route topology discovery in data networks using a distance-vector routing protocol.

Telecommunications networks in the past have consisted of circuit-switched networks. Generally, circuit-switched networks include multiple network elements communicatively interconnecting a source location and a destination location. A circuit or a static communications path through the multiple network elements is established linking the source location to the destination location. Once the circuit has been established, the source location would be connected to the destination location and communications may be performed there between. The circuit remains established for the duration of the session. These types of sessions would be used for both voice and data, such as voice conversations, facsimiles, data modems, and the like.

Because the circuit is maintained for the entire duration of the session regardless of amount of use, a circuit-switched network may be an inefficient use of the network elements. This is particularly true of some data applications in which the data transmission is bursty. For example, if an application consisted of data being sent from a first user to a second user, who reviews the information and transmits a response back to the first user, a circuit would be maintained even though no information was being transmitted during the time that the second user spent reviewing the information.

In contrast to a circuit-switched network, a packet-based network does not establish a static circuit or communication path between the first location and the second location for the duration of the session. Rather, a packet-based network breaks data into packets, which are then individually sent from the first location to the second location over a network of interconnected network elements and individually routed to their destination. In this manner, the packets may be dynamically re-routed in the event a fault condition is detected on a particular link or on a particular device. The data is then reconstructed from the individual packets at the second (destination) location. In this manner, the resources of the network elements may be used by other sessions or unrelated data traffic when not currently being used to transmit data, thereby allowing a more efficient use of resources than circuit-switched networks.

Some such packet-based networks utilize a transport protocol such as the Internet Protocol (IP) and one such example is the Internet. The Internet, and other data networks, comprises a collection of interconnected network elements. Data packets are routed from one network element to another based upon routing tables contained in each network element until the packet arrives at the destination. If a network element or a link between network elements fails, then the packet is rerouted through different network elements.

A distance-vector routing protocol operates based on routers advertising routes to other routers as vectors of distance and direction, wherein distance is typically in terms of numerically abstract metrics and direction typically in terms of a next-hop router. A route will initially enter (originate) into the distance-vector protocol from either the IP address on a particular interface on a router or from another routing protocol (example—BGP) on that router. The router then advertises that route via the distance vector protocol to its distance vector routing neighbors. The route is advertised in distance-vector terms with a distance equal to the distance between the advertising routing and the learning router. The direction is equal to the router the route was learned from. The router that has learned the route then advertises it to its neighbors with a new distance equal to the distance from the originating router to the advertising router plus the distance to the new router the route is being advertised to. This process carries on across the network.

Monitoring the path taken by sessions through the network elements, however, is difficult, particularly when the network elements utilize a distance-vector routing protocol such as Extended Interior Gateway Routing Protocol (EI-GRP). EIGRP is a Cisco proprietary routing protocol that provides limited information regarding the network topology. Because only limited network topology information is provided, a network topology map is not always available, thereby making it difficult to monitor the network for problems and making the necessary adjustments.

SUMMARY OF THE INVENTION

These and other problems are generally solved or circumvented, and technical advantages are generally achieved, by preferred embodiments of the present invention which provides a system and method for route topology discovery in data networks.

In an embodiment, a system and method for performing topology discovery in a data network is provided. Network elements utilizing a distance-vector protocol, such as EIGRP, advertises routes and metric information. A resource control point or other element analyzes the advertised routes and metrics and determines the nexthop, thereby providing a topology map of the network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a network diagram embodying features of an embodiment of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a voice-over-IP (VOIP) application delivering sessions over an IP network. Embodiments of the present invention may also be applied, however, to other applications and communication systems, services, networks, and the like. For example, embodiments of the present invention may be utilized in web-based applications (e.g., HTTP, SOAP/XML sessions), applications exhibiting long-lived sessions, monitoring data traffic tunnels or other data paths in a data network, other packet-based networks, and the like.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
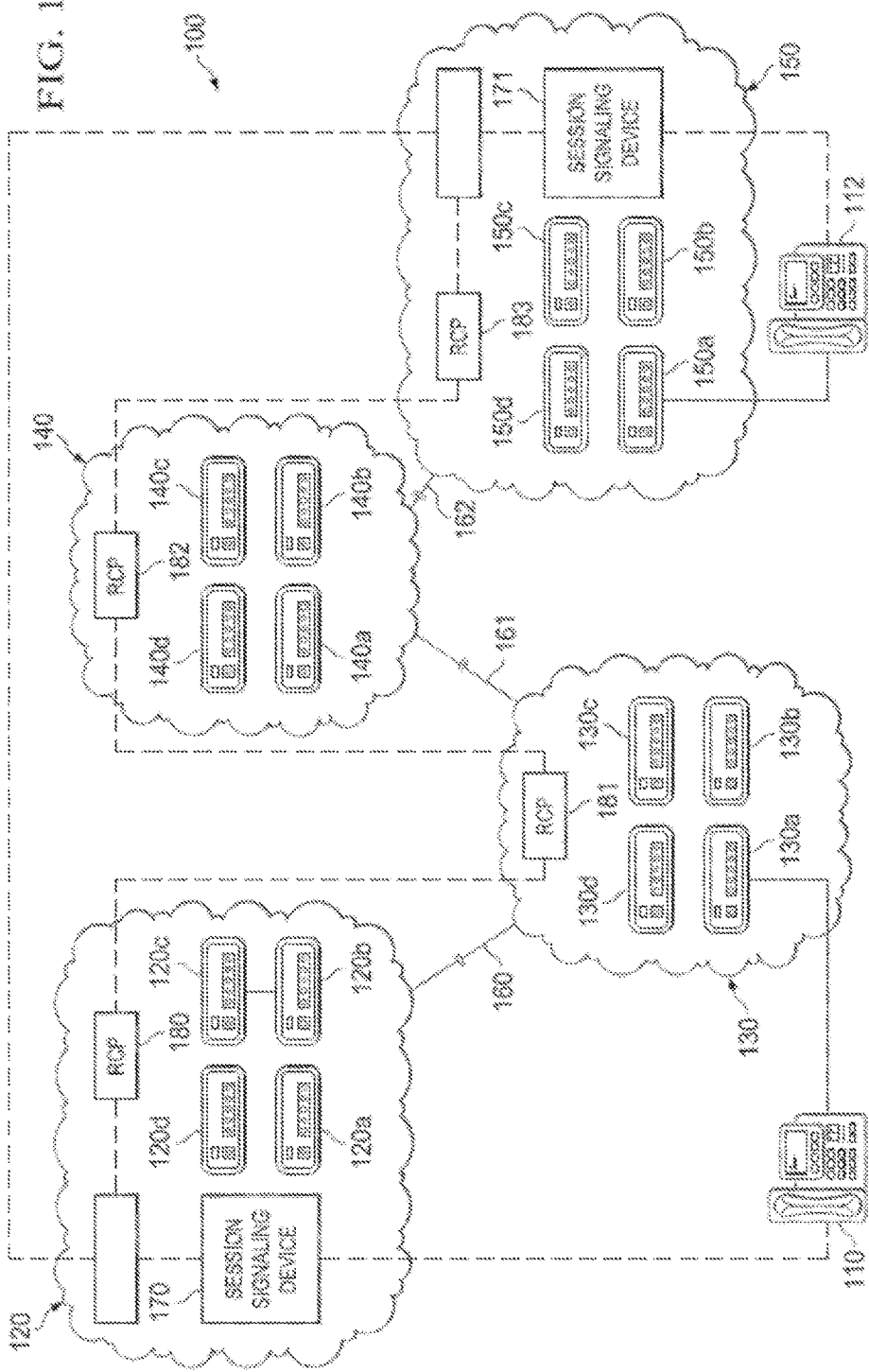
FIG. 1 is a network diagram embodying features of an embodiment of the present invention.

Referring now to FIG. 1, reference numeral 100 designates a network environment embodying features of an embodiment of the present invention. The network environment 100 includes a originating customer device 110 and a terminating customer device 112 communicatively coupled via one or more network domains, such as network domains 120, 130, 140, and 150. Each network domain 120, 130, 140, and 150 comprises one or more network elements, such as network elements 120a-120d, 130a-130d, 140a-140d, and 150a-150d, respectively.

As illustrated in FIG. 1, the network elements within a network domain are interconnected. For example, the network elements 120a-120d contained with the network domain 120 are interconnected to each other. The other network domains 130, 140, and 150 illustrate a similar configuration.

It should be noted, however, that the configuration of the network domains 120, 130, 140, and 150 as well as the configuration of the network elements 120a-120d, 130a-130d, 140a-140d, and 150a-150d within each of the network domains 120, 130, 140, and 150, respectively, are provided for illustrative purposes only. As one of ordinary skill in the art will appreciate, the network domains 120, 130, 140, and 150 as well as the configuration of the network elements 120a-120d, 130a-130d, 140a-140d, and 150a-150d may have any configuration, including different configurations with each of the network domains 120, 130, 140, and 150. Furthermore, the number of and the interconnections of the network elements 120a-120d, 130a-130d, 140a-140d, and 150a-150d may vary between network domains.

As indicated by the inter-domain links 160-162, the network domains 120, 130, 140, and 150 are communicatively coupled to one or more other network domains. For illustrative purposes, the network domain 120 is illustrated as being communicatively coupled to the network domain 130, the network domain 130 is illustrated as being communicatively coupled to the network domains 120 and 140, the network domain 140 is illustrated as being communicatively coupled to the network domains 130 and 150, and the network domain 150 is illustrated as being communicatively coupled to the network domain 140. Each of the network domains 120, 130, 140, and 150, however, may have other connections. For example, the network domain 140 may also be communicatively coupled to the network domain 120.

The inter-domain links 160-162 are illustrated as a single link interconnecting network domains for illustrative purposes only. In an embodiment, the inter-domain links 160-162 comprise a plurality of links to provide a greater capacity and redundancy. In this manner, if a link fails, then communication may still occur between the affected network domains. It should also be noted that the inter-domain links 160-162 are coupled to one or more of the network elements 120a-120d, 130a-130d, 140a-140d, and 150a-150d. The inter-domain links 160-162 are illustrated as terminating at the network domains 120, 130, 140, and 150 for illustrative purposes only and to simplify the network environment 100.

The network environment 100 also includes session signaling devices 170 and 171. In an embodiment, the session signaling devices 170 and 171 comprise softswitches using, for example, the SIP or H.323 signaling protocols that provide call control functions for call setup and teardown. In other embodiments, the session signaling devices 170 and 171 may include application servers, session border controllers, security gateways, and/or the like.

Additionally, the network environment 100 also includes one or more resource control points (RCP), such as RCPs 180-183. In an embodiment, each network domain 120, 130, 140, and 150 is equipped with an RCP, such as RCP 180, 181, 182, and 183, respectively, as illustrated in FIG. 1. The RCPs 180-183 are communicatively coupled to the network elements within each of the respective network domains. The RCPs 180-183 are further communicatively coupled to one or more other RCPs. For example, RCP 181 is communicatively coupled to the network elements within the network domain 130 (e.g., network elements 130a-130d) and to the RCPs 180 and 182.

As illustrated in FIG. 1, at least some of the RCPs within the network environment 100 are communicatively coupled to the session signaling devices. In the embodiment illustrated in FIG. 1, RCP 180 is communicatively coupled to the session signaling device 170 and RCP 183 is communicatively coupled to the session signaling device 171. In an embodiment, RCPs are communicatively coupled to session signaling device via a direct logical link. In this embodiment, the session signaling device communicates directly with the RCPs by transmitting a message directed to the RCP. In another embodiment, the RCPs passively monitor the call signaling communications between the respective session signaling device and other network elements.

FIG. 2 illustrates the communication between an RCP 210 and network elements 212 within a network domain 214 in accordance with an embodiment of the present invention. The RCP 210 may represent any of the RCPs 180-183, the network elements 212 may represent the respective network elements 120a-120d, 130a-130d, 140a-140d, and 150a-150d, and the network domain 214 may represent the respective network domains 120, 130, 140, and 150 of FIG. 1.

In an embodiment, the RCP 210 speaks IP routing protocols, such as OSPF, ISIS and/or BGP, to the other devices in the network such that the RCP 210 appears to those other devices to be another router or network element to the network elements 212. In this manner, the RCP 210 is provided the routing table information associated with each of the network elements 212. The routing table information provided can be learned directly via communications from a particular network element 212 or indirectly through communications with one or more of the network elements 212. By the RCP 210 communicating with the network elements 212, the network elements 212 communicate with the RCP 210 to provide routing and information to the RCP 210. This allows the RCP 210 to initially derive the route information associated with each network element in 212 and to dynamically maintain the route information. The route information may include, for example, information pertaining to which network elements are present, how the network elements are interconnected for routing purposes, what path packets destined from a particular device to another device in the network will take, and the like.

In an embodiment, the communications between the RCP 210 and the network elements 212 may be performed using different protocols. Generally, the network elements 212, such as routers, support various types of protocols, wherein each protocol may provide different information not available when using other protocols. For example, in an embodiment the RCP 210 communicates with the network elements 212 using the Open Shortest Path First (OSPF) protocol and the Border Gateway Protocol (BGP). Using the OSPF protocol allows the RCP 210 to retrieve information to calculate the OSPF portion of the routing table of the network elements 212. In an embodiment, each of the OSPF-speaking network elements 212 within the network domain 214 has all of the routing information necessary to calculate the routing table information for any particular network element 212 associated with the OSPF protocol assuming that all network elements 212 are part of the same OSPF area. Accordingly, it may only be necessary for the RCP 210 to communicate with only the network elements 212 which contain unique OSPF area routing information to retrieve all of the routing information between network elements 212 within the network domain 214. The information on the RCP 210 obtained from the network elements 212 via, for example, OSPF, preferably includes a series of Link State Advertisements (LSAs). On an OSPF-enabled network element, such as network element 212, OSPF uses a database of LSAs to determine the interconnections between the network elements 212 plus any other devices within the OSPF area. The OSPF-enabled network element 212 may perform a routing algorithm, such as a Dijkstra or Shortest Path First algorithm, on that LSA data starting with itself as a "root" of the calculation to determine its OSPF routes. By using the information obtained by the RCP 210 using OSPF or some other protocol, the RCP 210 determines the routes of any particular network element 212 by applying, for example, a Dijkstra or Shortest Path First algorithm to the LSA database obtained by the RCP 210 via OSPF, or other protocol, with the particular network element 212 that acts as the "root" of the Dijkstra or Shortest Path First algorithm. The result is that the RCP 210 can calculate the OSPF protocol portion of the route table associated with any particular network element 212.

Using the BGP routing protocol allows the RCP 210 to retrieve the routing information associated with the BGP protocol which includes inter-network domain (such as between network domain 214 and a network domain 224, routing information potentially having the scope of the entire Internet. While the RCP 210 may retrieve part of the necessary routing information using the OSPF protocol by communicating with a single network element, the RCP 210 may communicate to each of the network elements 212 using BGP to determine all of the routing information between network domains if BGP is enabled within the routing domain. In the case of BGP, the RCP 210 establishes Internal BGP peering relationships with each BGP-speaking router among the network elements 212. These peering relationships are IBGP (Internal BGP) sessions. On each session established between RCP 210 and the BGP-speaking network elements 212, the route reflection client option within BGP is enabled. The combination of making the BGP peering relationship IBGP and enabling the route reflection client option on the peering relationship will result in each of the BGP-speaking network elements 212 sending their entire BGP portion of their routing table to the RCP 210. In this manner, the RCP 210 gains all of the BGP routing information for all of the individual BGP-speaking network elements 212.

Additionally, the RCP 210 may retrieve additional information regarding the routing information and the network. The OSPF and BGP protocols generally provide routing information regarding the network elements 212, but are limited to routing information shared between and among the network elements 212. The network elements 212, however, also contain information regarding the network elements 212 and the links there between that are not shared among the network elements 212 through routing protocols. This information may be retrieved by the RCP 210 utilizing another communications method to request the specific information.

For example, a request may be initiated by the RCP 210 using Simplified Network Management Protocol (SNMP), a command line interface (CLI), an extended markup language (XML), or the like to obtain additional information from one or more of the network elements 212. The additional information may include, for example, static routing information, Multi-Label Protocol Label Switching (MPLS) tunnel characteristics, link names, network element names, status information, capacity information, secondary IP addresses, routing distance policy, route redistribution policy, and the like. In the case of static routing information, which is provisioned routing information unique to a network element 212 and not shared via a routing protocol between network elements, the static routes of a particular network element 212 may be acquired via the methods previously discussed.

One of ordinary skill in the art will appreciate that by adding the RCP 210 to the routing tables of the network elements 212 within the respective network domain 214, the RCP 210 will be automatically updated with respect to any changes within the network domain. For example, upon power-up the network elements 212 will communicate using the OSPF protocol the routing information within the network domain 214 to the RCP 210. The RCP 210 may communicate with each of the network elements 212 within the respective network domain 214 using the BGP to determine the routing information between network domains and/or business networks/entities. Thereafter, if a link or a network element fails or the status changes, the RCP 210 is notified because the RCP 210 is contained within the routing tables of the individual network elements 212. The RCP 210 may further communicate with each of the network elements 212 within the respective network domain 214 using, for example, the SNMP/CLI/XML to determine other routing information not available using the other protocols.

FIG. 2 also illustrates the communications between RCPs, such as the RCP 210 and a RCP 220, in accordance with an embodiment of the present invention. In an embodiment, a set of extensions to the Common Open Policy Service (COPS) protocol known as COPS-RM is used. At system startup, the RCPs 210 and 220 communicate via COPS-RM to notify each other of the network interfaces that comprise the edges of their domain. For example, the RCP 210 will notify the RCP 220 of all the network links that connect the network elements 212 within the domain of RCP 210 with the network elements 212 within the domain of RCP 220. When links connecting the domains are added or removed, the RCPs 210 and 220 communicate with each other to notify each other of the changes through COPS-RM. In normal system operation, sessions on paths that span domains are signaled from one RCP domain to the next via COPS-RM.

It should be noted that the protocols and the procedures discussed above were provided for purposes of illustration only. One of ordinary skill in the art will realize that other routing protocols and procedures may be used. For example, protocols such as Intermediate System-Intermediate System (ISIS), Routing Information Protocol (RIP), Interior Gateway Routing Protocol (IGRP), Enhanced IGRP (EIGRP), or the like may also be used.

EIGRP is an example of a distance-vector routing protocol for IP networks that uses a system of diffusing computations (coordinated routing table calculations among multiple routers) to calculate route tables on each router in the network. In embodiments such as these, the RCP may obtain information from each EIGRP router about IP interfaces associated with each specific EIGRP router and use this information to derive a network topology map. The information may include the name of the link, its IP address, its netmask length and its link metric (cost), and may be obtained using, for example, SNMP or CLI based probing.

Generally, for the RCP to determine the network topology, the RCP determines the nexthop attribute of each route for each learned route. In protocols such as EIGRP, the nexthop attribute of an EIGRP route cannot be learned from an EIGRP session directly. On an EIGRP router, the nexthop attribute is created as part of the route calculation process, but the nexthop attribute is not advertised in the route information sent to other routers. It should be noted that while the route structures in the protocol contain a field for an advertised nexthop, EIGRP routers insert a zero into the nexthop attribute field.

Figure 3:
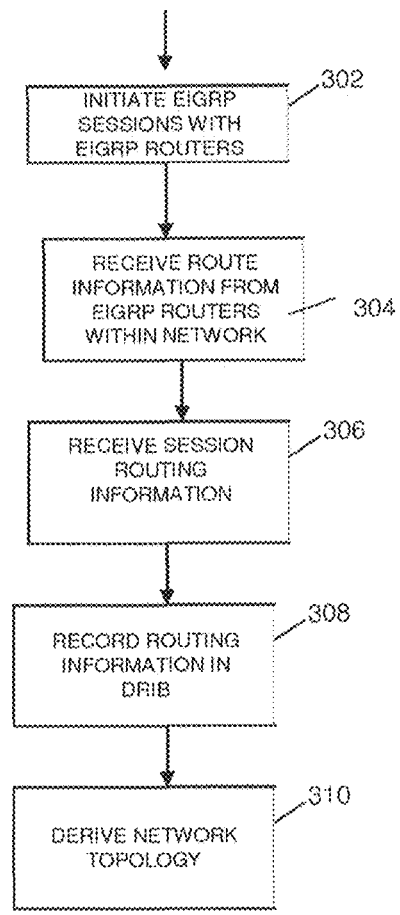
FIG. 3 is a process flow diagram illustrating a method performing network topology discovery using a distance-vector protocol an embodiment.

FIG. 3 illustrates a method in which the RCP may obtain information from each EIGRP router about its configured EIGRP routing sessions. The process begins in step 302 by initiating EIGRP sessions with each EIGRP router. Each EIGRP session initiated by the RCP will have the "EIGRP Stub Router" feature requested. The EIGRP Stub Router feature allows the RCP to create an EIGRP session with an EIGRP router without having the RCP participate in the diffusing route computations of the EIGRP routers it is connected to. The EIGRP speaking router will simply deliver its routing table to the RCP. The RCP will form individual EIGRP sessions with each EIGRP speaking router in the region of the network via, for example, point-to-point GRE (Generic Route Encapsulation) tunnels or through a VLAN. In this manner, the RCP will be told when an EIGRP route is added or withdrawn from one of the EIGRP routers, but the RCP will not participate in any route computations associated with the EIGRP network, as indicated in step 304. The RCP may receive and record the local and remote IP addresses of each EIGRP routing session as well as determine the IP interface associated with each the EIGRP routing session as indicated by step 306. Any EIGRP sessions to an RCP, i.e., the EIGRP Stub Router, will be ignored and not recorded.

The RCP places each learned route into a Distributed Routing Information Base (DRIB) routing tables on the RCP, which minors the routing tables of the EIGRP routers, as indicated by step 308. When the EIGRP router adds a route, it is added to the DRIB, and conversely, when an EIGRP router withdraws a route, it is removed from the DRIB.

Figure 4:
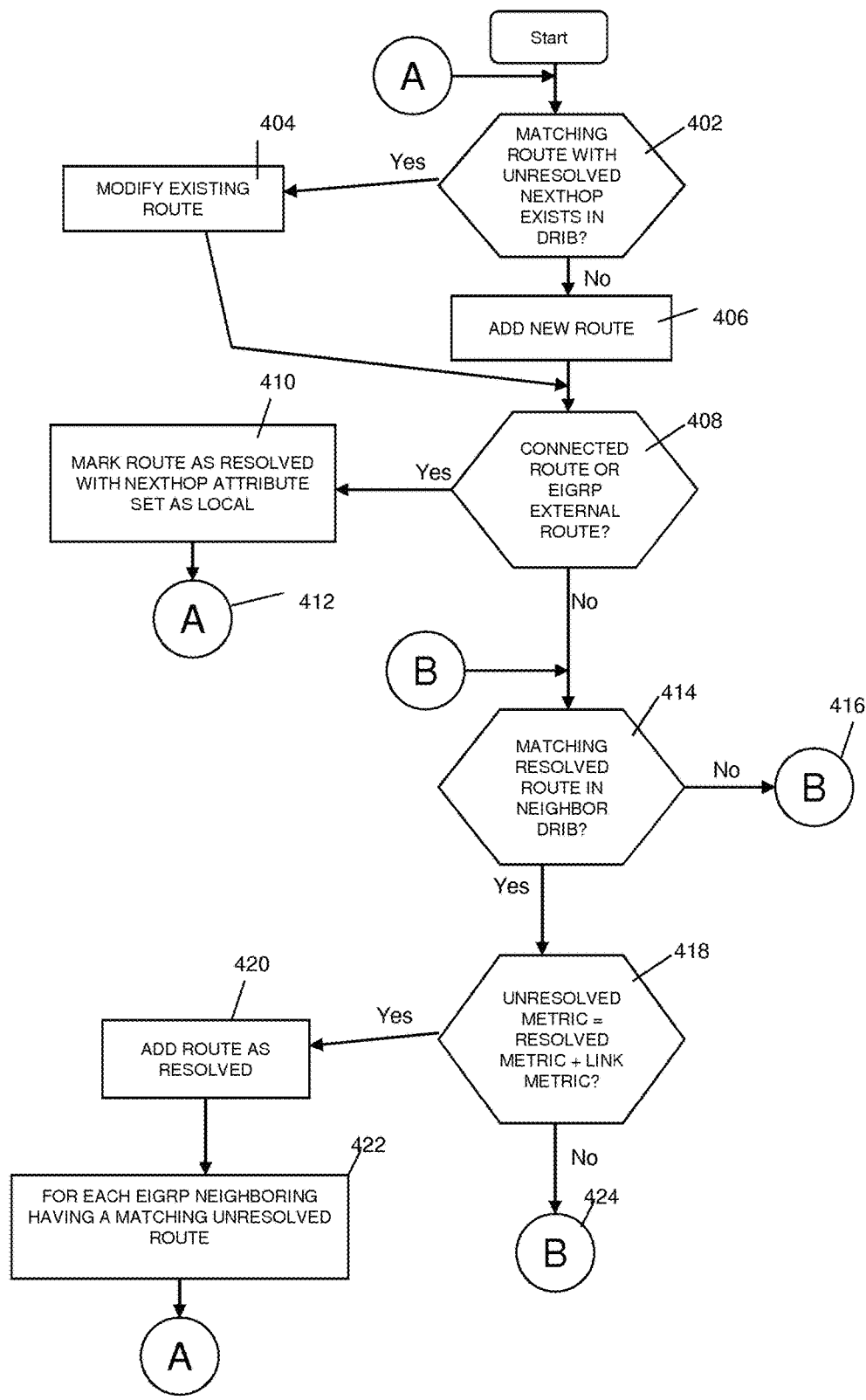
FIG. 4 is a process flow diagram illustrating adding a route in accordance with an embodiment.

FIG. 4 illustrates a method that may be used to add an EIGRP route to the DRIB table in accordance with an embodiment. The process begins in step 402, wherein a determination whether or not a matching route with an unresolved nexthop attribute exists in the DRIB. If a matching route with an unresolved nexthop attribute exists, then processing proceeds to step 404, wherein the existing route is modified in the DRIB. If, on the other hand, a determination is made that a matching route with an unresolved nexthop attribute does not exist in the DRIB in step 402, then processing proceeds to step 406, wherein the route is added to the DRIB. After step 404 or 406, processing proceeds to steps 408-424, wherein an attempt is made to resolve the route to determine the nexthop attribute.

Referring first to step 408, a determination is made whether or not the route is a connected route or an EIGRP external route that originated on the EIGRP router represented by the DRIB. Generally, a connected route is a route associated with a communications interface resident on the router and an external route is a route for the EIGRP router that was learned from a different protocol, such as BGP. If a route on a particular router is determined to be external or connected, then the route in EIGRP terms originated on that particular router rather than being learned from another EIGRP router. A route that is traced back in EIGRP terms to a connected or external route on a router may be referred to as being fully resolved in EIGRP topology terms, such that the EIGRP information does not indicate any further trace information. If so, then processing proceeds to step 410, wherein the route is entered in the DRIB as a resolved route and the nexthop attribute as being local, i.e., there is no nexthop. Because the addition of the current route may allow routes in neighboring EIGRP routers to be resolved, processing returns to step 402 to check for and attempt to resolve corresponding routes in each neighboring EIGRP router as indicated by step 412.

If a determination is made in step 408 that the route is not a connected route or an EIGRP external route that originated on the EIGRP router represented by the DRIB, then processing proceeds to step 414, wherein a determination is made whether or not a matching route exists in a DRIB of any neighboring EIGRP router that is resolved. If not, then the next neighbor is checked for a matching resolved route as indicated in step 416.

Otherwise, processing proceeds to step 418, wherein a determination is made whether or not the link metric of the unresolved route equals the sum of the link metric of the resolved neighbor route and the link metric of the interface associated with the EIGRP neighbor. Generally, as noted above, when the EIGRP router advertises routes, the EIGRP router reports a metric associated with each route. The metric is a combination of various factors such as bandwidth, delay, and the like, and is an indication of the cost of using the route. Thus, the metrics may be used to resolve the routes, or in other words, to determine the next hops of the EIGRP routers. An example of resolving the route is provided below with reference to FIG. 4.

If a determination is made in step 418 that the metric of the unresolved route equals the sum of the resolved neighbor route and the link metric of the interface associated with the EIGRP neighbor, then route is resolved. The route is added to the DRIB as a resolved route with the IP address of the interface associated with the neighbor as the nexthop as indicated in step 420. Thereafter, as indicated by step 422, processing may return to step 402 to check each EIGRP neighbor to determine if routes in neighboring EIGRP routers may now be resolved.

Otherwise, the next neighbor is checked for a matching resolved route as indicated in step 424.

Figure 5A:
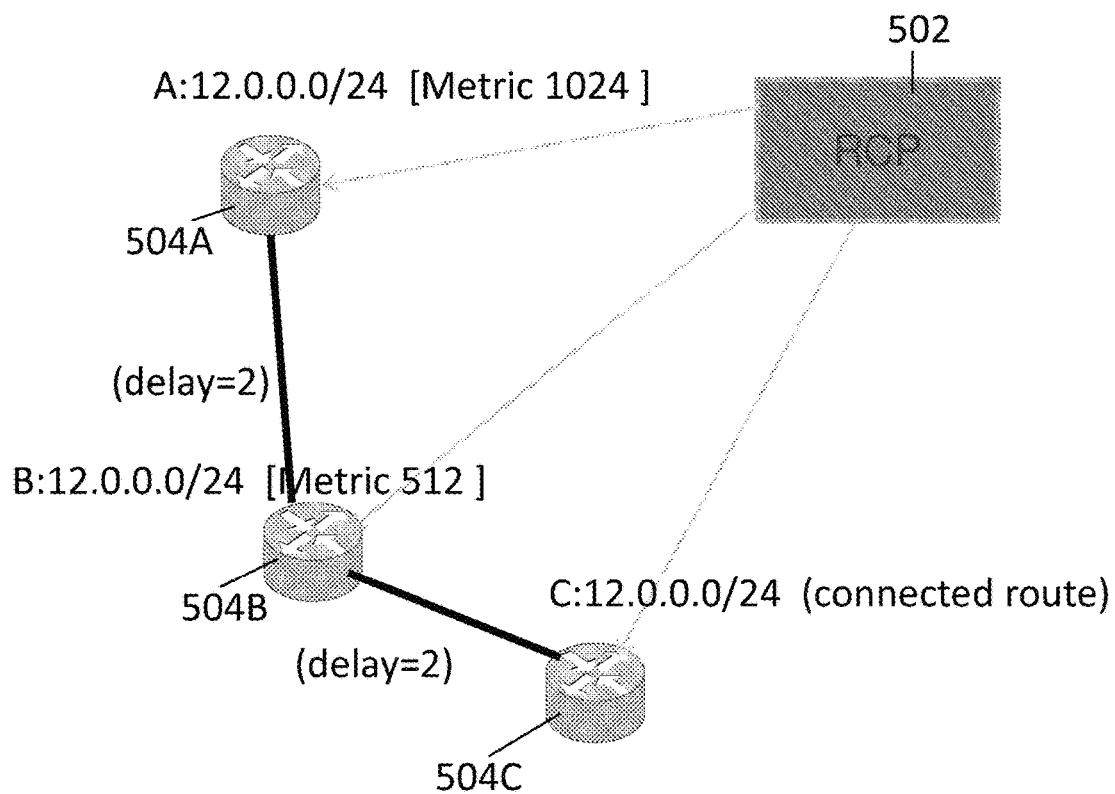
FIGS. 5a and 5b illustrate an example of resolving a route in accordance with an embodiment.
Figure 5B:
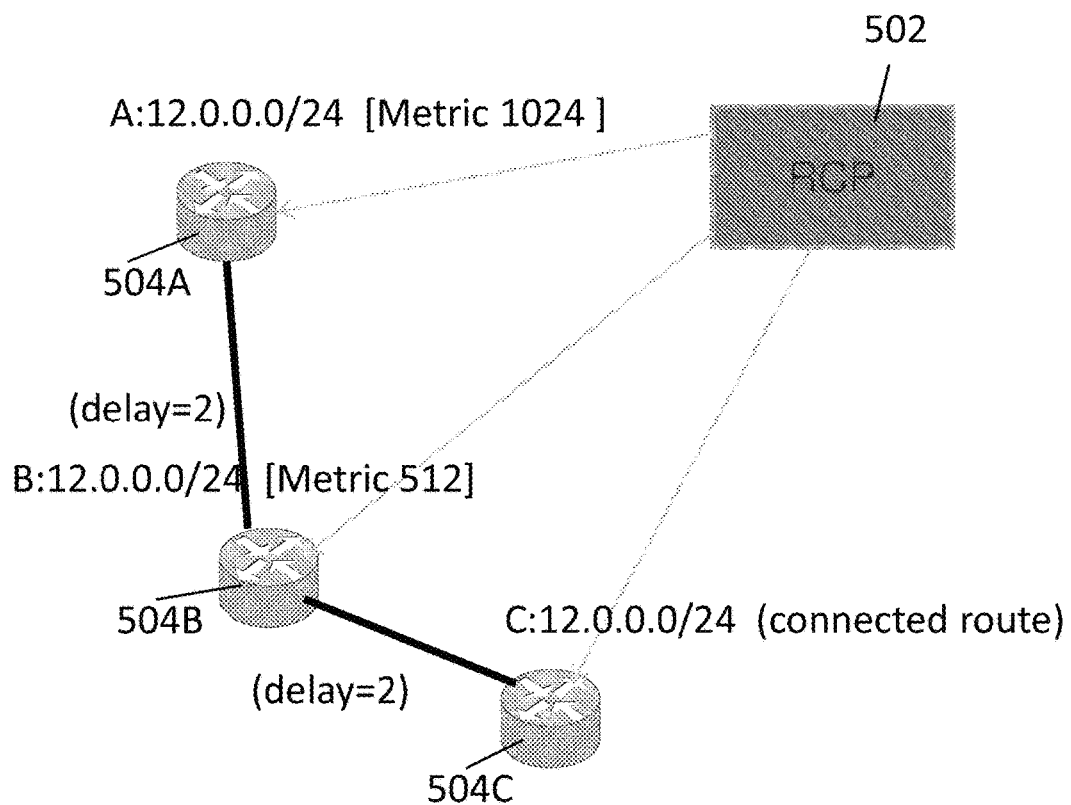

FIGS. 5a and 5b illustrate an example of resolving a route. Referring first to FIG. 5a, an RCP 502 and EIGRP routers 504a-504c are illustrated. In this example, the EIGRP router 504a broadcasts route A:12.0.0.0/24 having a metric of 1024, the EIGRP router 504b broadcasts route B:12.0.0.0/24 having a metric of 512, and the EIGRP router 504c broadcasts a connected route C:12.0.0.0/24 having no metric as a connected route. The RCP also obtains a delay between EIGRP router 504a and EIGRP router 504b of 2, and a delay between EIGRP router 504b and EIGRP router 504c of 2. The RCP 502 evaluates this information and determines that the route A:12.0.0.0/24 metric of 1024 equals the sum of the route B:12.0.0.0/24 metric of 512 plus the delay (multiplied by the scale factor of 256) from the EIGRP router 504a to the EIGRP router 504b. Accordingly, the link from EIGRP router 504a to EIGRP router 504b must be the nexthop for the route A:12.0.0.0/24 having a metric of 1024, as illustrated in FIG. 5b.

A similar analysis may be made for the route B:12.0.0.0/24 having a metric of 512. In particular, the RCP 502 determines that the route B:12.0.0.0/24 metric of 512 equals the sum of the route B:12.0.0.0/24 metric of 512 plus the delay (multiplied by the scale factor of 256) from the EIGRP router 504b to the EIGRP router 504c. Accordingly, the link from EIGRP router 504b to EIGRP router 504c must be the nexthop for the route B:12.0.0.0/24 having a metric of 512, as illustrated in FIG. 5b.

Figure 6:
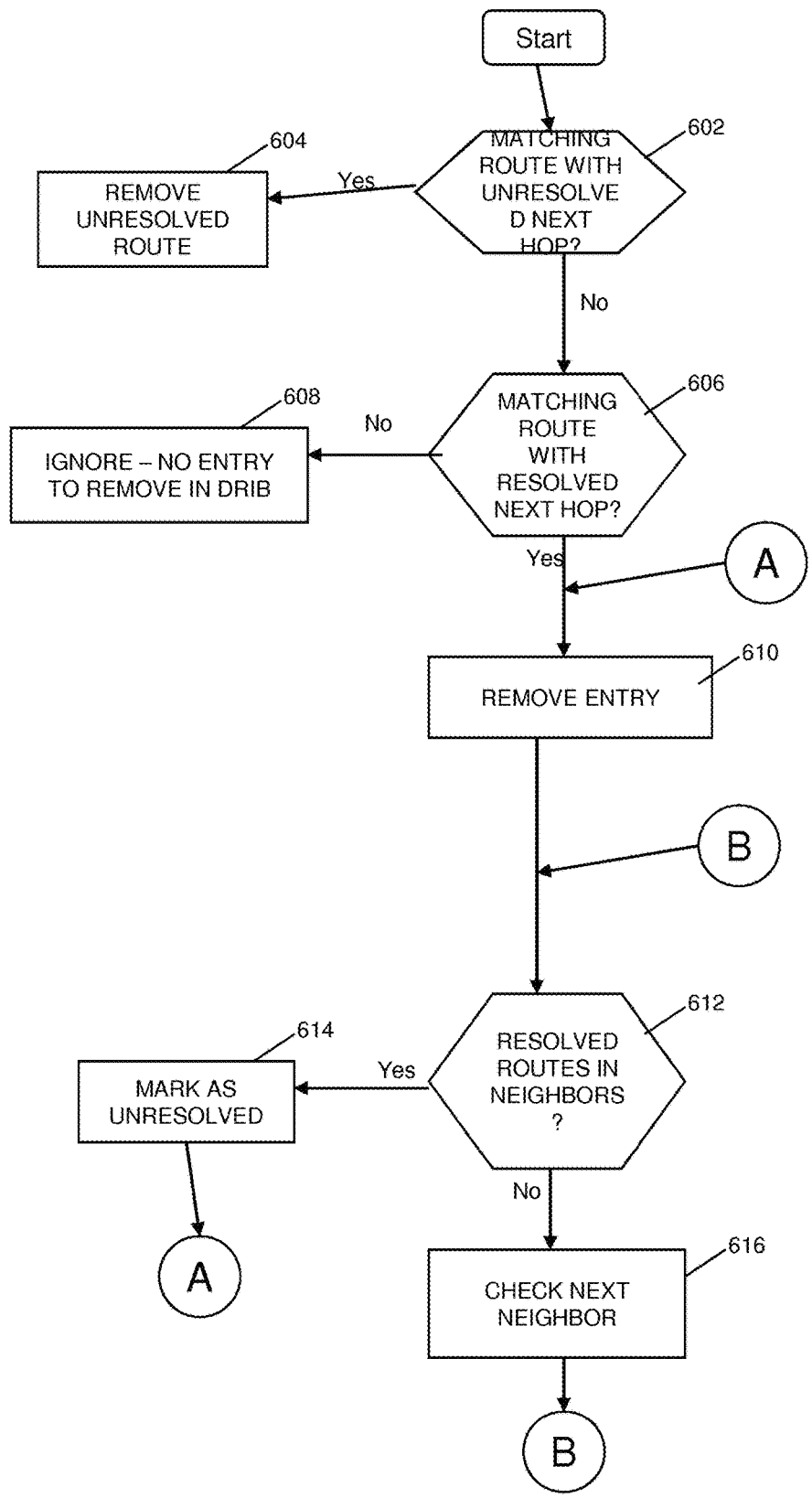
FIG. 6 is a process flow diagram illustrating removing a route in accordance with an embodiment.

FIG. 6 illustrates steps that may be performed to remove an EIGRP route from the DRIB tables, such as when a link fails or is otherwise taken off-line. The process begins in step 602 wherein a determination is made whether or not a matching unresolved route exists in the DRIB. If so, then processing proceeds to step 604, wherein the route is removed from the DRIB and the process terminates. Because the route is unresolved, it is known that no other routes in DRIBs of other EIGRP routers are dependent upon the removed route.

If an unresolved route does not exist, then processing proceeds to step 606, wherein a determination is made whether or not a resolved route exists in the DRIB for the route being removed. If not, then processing proceeds to step 608, wherein the route being removed is ignored and processing terminates. Because the route being removed is not located in the DRIB as either a resolved route or an unresolved route, then no changes are necessary for the DRIB.

If it is determined that a resolved route exists in the DRIB for the route being removed in step 606, then processing proceeds to step 610, wherein the route in the DRIB corresponding to the route being removed is deleted from the DRIB.

Thereafter, in step 612, a determination is made if any route in a DRIB of any neighboring EIGRP routers are now unresolved. If so, then the corresponding routes are marked as unresolved as indicated in step 614 and processing proceeds to step 610 to remove the unresolved route. Otherwise, if the routes remain resolved, then no modifications are necessary in the DRIBs of the neighboring EIGRP routers and the next neighbor is checked as indicated in step 616.

Figure 7:
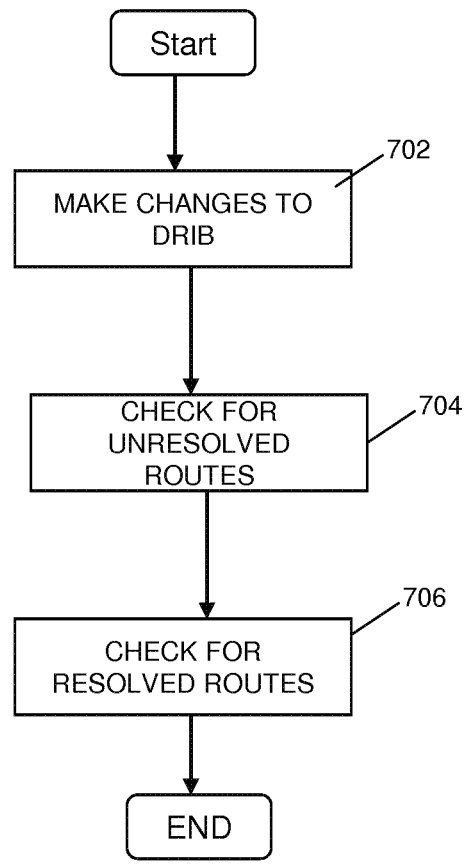
FIG. 7 is a process flow diagram illustrating modifying attributes of a route in accordance with an embodiment.

FIG. 7 illustrates steps that may be performed to modify attributes of an EIGRP router, such as changes in the link metrics associated with routes of the EIGRP router. The method begins in step 702 wherein the DRIB is modified according to the reported changes. Next, in step 704, any unresolved routes in DRIBs of neighboring EIGRB routers are analyzed to determine if the unresolved routes may now be resolved. One of ordinary skill in the art will appreciate that routes that may have remained unresolved may now be resolved based on new metric data. Accordingly, in step 704, unresolved routes in all neighboring EIGRP routers are examined to resolve, if possible, the unresolved routes.

Thereafter, neighbor EIGRP routers are examined to determine if any of the resolved routes in the DRIBs of all the neighbors of that EIGRP router whose nexthop matches the IP address of the EIGRP interface experiencing attribute changes are now unresolved due the attribute changes of a route as indicated in step 706. If so, then the determined route is marked as an unresolved route.

It should be noted that the steps discussed above are performed recursively for all neighboring EIGRP routers every time a route is changed. For example, if the above process results in a neighbor EIGRP router changing one of its routes, then neighbors of that neighbor EIGRP router are then checked. This process continues to repeat until the appropriate changes are made to all affected EIGRP routers.

It should be noted that some EIGRP routers may utilize an auto-summarization feature. When enabled, the auto-summarization feature summarizes the EIGRP routes advertised to neighbor EIGRP routers that are on a different network. The routes are summarized to classful (Class A, B, C) IP network addresses before they are advertised to a neighbor on a different classful network. In an embodiment, the EIGRP topology learning utilizes the unsummarized EIGRP routes from routers.

Figure 8:
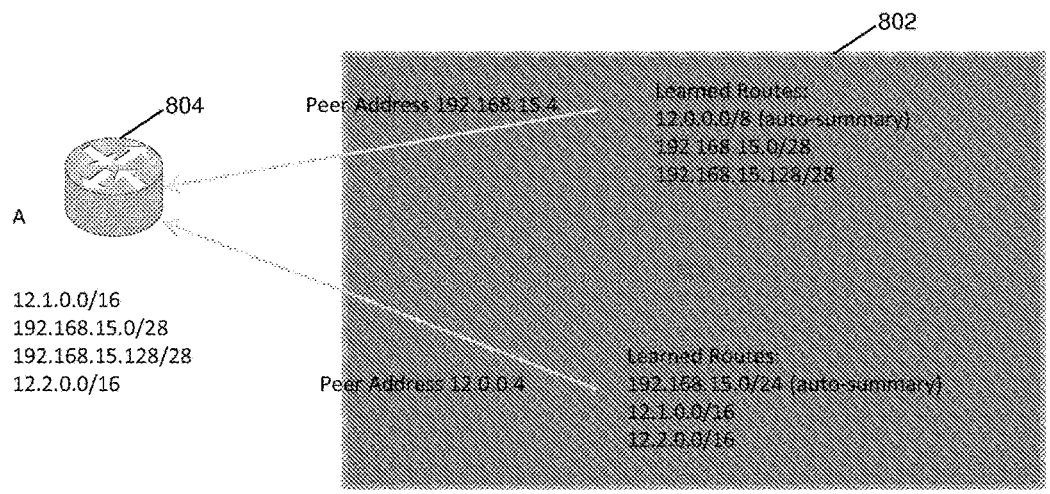
FIG. 8 illustrates a process that may be used to learn the unsummarized routes in accordance with an embodiment.

FIG. 8 illustrates a process that may be used to learn the unsummarized EIGRP routes. The RCP 802 creates multiple EIGRP neighbors, two in this case, to the EIGRP router 804 performing auto-summarization. In the example illustrated in FIG. 8, the EIGRP router 804 has the routes 12.1.0.0/16, 12.2.0.0/16, 192.168.15.0/28, and 192.168.15.128/28. When using auto-summarization, the EIGRP router 804 reports 12.0.0.0/8 and 192.168.15.0/24. To learn the unsummarized EIGRP routes, the RCP 802 creates, for example, a route 192.168.15.4 and a route 12.0.0.4. The address of 192.168.15.4 prevents the EIGRP router 804 from summarizing 192.168.15.0/28 and 192.168.15.128/28, thereby causing both routes to be advertised to the RCP 802. Likewise, the address of 12.0.0.4 prevents the EIGRP router 804 from summarizing 12.1.0.0/16 and 12.2.0.0/16 thereby causing both routes to be advertised to the RCP 802. As a result of this process, the RCP 802 learns the unsummarized routes.

Figure 9:
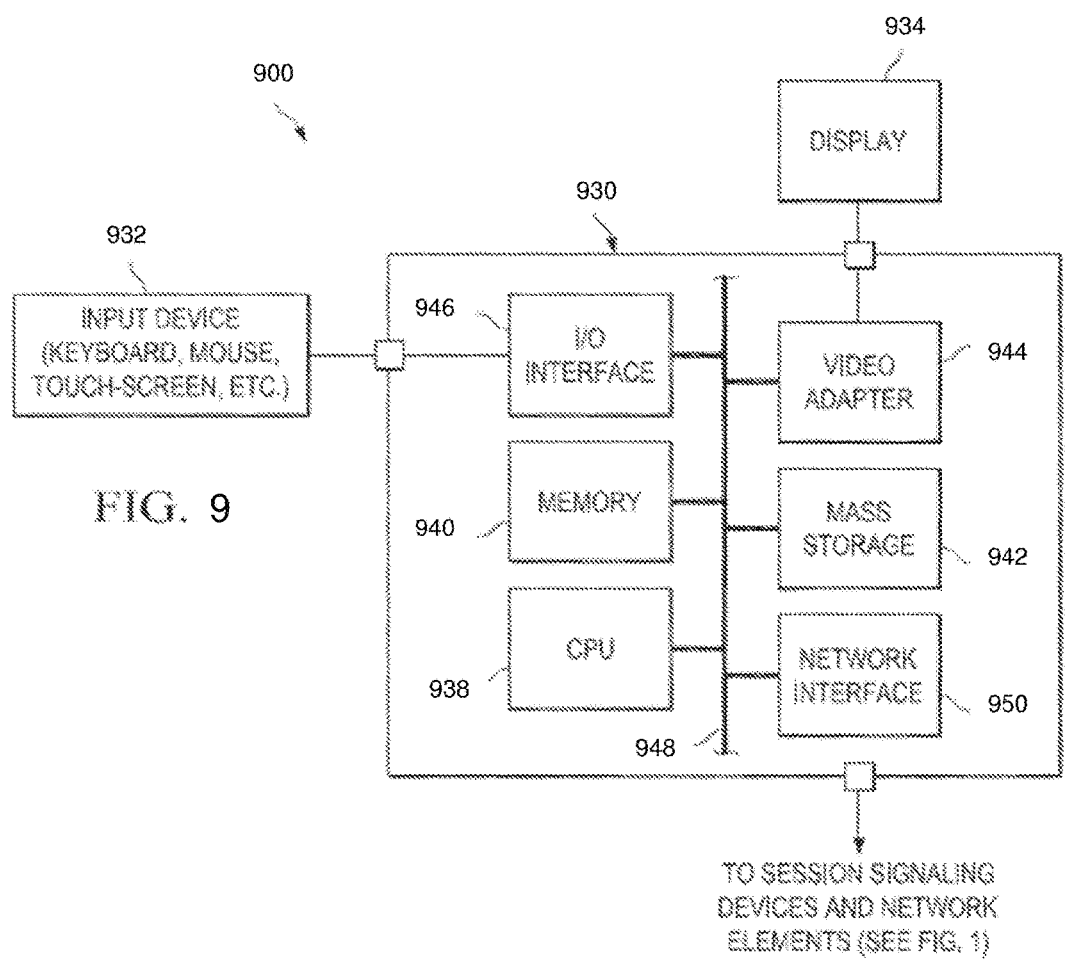
FIG. 9 is a block diagram of a resource control point in accordance with an embodiment.

FIG. 9 is a block diagram of an RCP 900, such as RCPs 180-183, and/or an EIGRP router in accordance with an embodiment of the present invention. Generally, the RCP 900 may comprise a processing unit 930 optionally equipped with one or more local input devices 932 (e.g., a mouse, a keyboard, or the like) and one or more output devices (e.g., a display 934 or the like). The processing unit 930 may be, for example, a desktop computer, a workstation, a laptop computer, a dedicated unit customized for a particular application, or the like. The processing unit 930 and the display 934 may be integrated into a single unit such as a laptop computer.

Generally, the processing unit 930 includes a central processing unit (CPU) 938, memory 940, a mass storage device 942, a video adapter 944, and an I/O interface 946 connected to a bus 948. The bus 948 may be one or more of any type of several bus architectures including a memory bus or memory controller, a peripheral bus, video bus, or the like. The CPU 938 may comprise any type of electronic data processor, such as a general purpose processor, a Reduced Instruction Set Computer (RISC), a Complex Instruction Set Computer (CISC), Application-Specific Integrated Circuit (ASIC), or the like. The memory 940 may comprise any type of system memory such as static random access memory (SRAM), dynamic random access memory (DRAM), synchronous DRAM (SDRAM), read-only memory (ROM), double data rate random access memory (DDR RAM), a combination thereof, or the like. In an embodiment, the memory 940 may include ROM for use at boot-up, and DRAM for data storage for use while executing programs.

The mass storage device 942 may comprise any type of storage device configured to store data, programs, and other information and to make the data, programs, and other information accessible via the bus 948. In a preferred embodiment, the mass storage device 942 is configured to store the computer software programs to be executed by the CPU 938. The mass storage device 942 may comprise, for example, one or more of a hard disk drive, a magnetic disk drive, an optical disk drive, solid state memories (e.g., flash and universal serial bus (USB) memory keys), or the like.

The video adapter 944 and the I/O interface 946 provide interfaces to couple external input and output devices to the processing unit 930. As illustrated in FIG. 9, examples of input and output devices include the display 934 coupled to the video adapter 944 and the input device 932 coupled to the I/O interface 946.

The processing unit 930 may also include a network interface 950. The network interface 950 allows the processing unit 930 to communicate with remote units via a network (not shown). In an embodiment, the processing unit 930 is coupled to a local-area network or a wide-area network to provide communications to other devices, particularly session signaling devices (e.g., session signaling devices 170 and 171), network elements (e.g., network elements 120a-120d, 130a-130d, 140a-140d and 150a-150d), other RCPs (e.g., RCPs 180-183), and the like. The network interface 950 may also provide a network connection to remotely access the RCP 900 for monitoring the status, performing maintenance, updating software, and the like. The network interface 950 may provide an interface for a wired link, such as an Ethernet cable or the like, and/or a wireless link. It should also be noted that a single connection is provided solely for illustrative purposes. Accordingly, the RCP 900 may have a one or more physical connections and each physical connection may have one or more logical connections to other network components.

It should be noted that the RCP 900 can include other components not shown in FIG. 9. For example, the RCP 900 can include power supplies, cables, a motherboard, removable storage media, cases, and the like.

Once obtained, the network topology may be used to monitor and maintain the network such as described in U.S. patent application Ser. No. 12/118,270 (corresponding to U.S. Patent Application Publication No. 2009/0070486) and U.S. patent application Ser. No. 12/209,909 (corresponding to U.S. Patent Application Publication No. 2009/0067423), both of which are incorporated herein by reference.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the functionality described herein may be performed by fewer or more varied components while remaining within the scope of the present invention. Additionally, one skilled in the art will realize that the type of information gathered, retrieved, and stored may vary while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for performing topology discovery, comprising:
   a network comprising a plurality of routers; and
   a resource control point;
   wherein the resource control point is configured to initiate sessions with the plurality of routers, wherein the sessions indicate that the resource control point does not participate in routing;
   wherein the resource control point is further configured to receive routes from the plurality of routers, each route including metric information;
   wherein the resource control point is further configured to resolve nexthops of the routes based upon the metric information;
   wherein the resource control point is further configured to save the routes in a routing table at the resource control point;

wherein the resource control point is further configured to receive information regarding removal of a first route of the routes;

wherein the resource control point is further configured to remove the first route from the routing table;

wherein the resource control point is further configured to resolve nexthops of the routes after the removing the first route.

2. The system of claim 1, wherein the resource control point is further configured, prior to removing the first route, to determine whether the first route matches a resolved route in the routing table.

3. A method of performing topology discovery, the method comprising:

initiating, by a resource control point, sessions with a plurality of routers within a network, wherein the sessions indicate that the resource control point does not participate in routing;

receiving routes from the plurality of routers by the resource control point, each route including metric information; and resolving nexthops of the routes based upon the metric information;

saving the routes in a routing table at the resource control point;

receiving information regarding removal of a first route of the routes;

determining if the first route matches a resolved route in the routing table and, if the first route matches a resolved route in the routing table, removing the first route from the routing table; and resolving nexthops of the routes after the removing the first route.

* * * * *